3,409,571
PHENOL - ALDEHYDE/PHENOL - KETONE
CONDENSATE-PHOSPHORUS CONTAIN-
ING ESTERS
Alvin F. Shepard and Bobby F. Dannels, Grand Island,
N.Y., assignors to Hooker Chemical Corporation,
Niagara Falls, N.Y., a corporation of New York
No Drawing. Filed Nov. 30, 1964, Ser. No. 414,851
9 Claims. (Cl. 260—17.2)

ABSTRACT OF THE DISCLOSURE

Novel esters of a member of the phosphorus family and a phenol-aldehyde or phenol-ketone condensate are characterized in that:

(1) a major proportion of the moiety of the member of the phosphorus family has the formula:

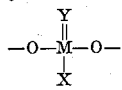

in which the unsatisfied bonds are attached to aryl nuclei of the same phenolic condensate, and in which M is an atom of the phosphorus family. Y is oxygen or sulfur, and X is halogen, hydroxyl, mercapto, hydrocarbyl, hydrocarbyloxy, halogen-substituted hydrocarbyl, halogen-substituted hydrocarbyloxy, or an aryloxy radical of the same phenolic condensate to which M is attached;

(2) at least 60 percent of the phenol-aldehyde or phenol-ketone condensate has o,o'-alkylidene linkages, and (3) the phenolic condensate has an average number of aryl nuclei per molecule in the range of 2.2 to 8.

Suitable members of the phosphorus family of elements are phosphorus, arsenic, antimony and bismuth.

The thermoplastic products of the invention can be modified to produce additional thermoplastic products such as reaction products with an oxyalkylation agent. Thermosetting products can be produced by curing the thermoplastic products with agents such as hexamethylene tetramine, or other donors of methylene radicals, or polyepoxides, or polyisocyanates, and the like. These thermoplastic and thermosetting products are used to produce shaped articles such as molded articles; laminates; protective coatings, including drying oils and varnishes; abrasive structures; friction elements, and the like. The compositions are also useful in basing cements and as foundry sand binders. The polyurethane compositions can be utilized for the preparation of foamed products, castings, coatings, and the like. The compositions are also useful for the treatment of normally combustible cellulosic materials to render them fire retardant.

---

This invention relates to novel aromatic polymers and more particularly to novel polymers based on phenol-aldehyde or phenol-ketone condensates. The invention further relates to processes for the preparation of such products.

Phenol-aldehyde condensates are well known for use in molding compounds and many other applications requiring resinous products. For most purposes, the conventional phenol-aldehyde condensates meet the requirements of industry and commerce. However, the conventional phenol-aldehyde condensates show a high loss of weight when subject to high temperatures for prolonged periods of time. While the fire resistance of the conventional phenol-aldehyde condensates is much better than the fire resistance of many polymeric materials, it is insufficient to satisfy the most stringent requirements encountered in present day commercial and industrial practice.

Accordingly, it is an object of the invention to provide novel polymeric products that have superior thermal stability, fire resistance and chemical resistance. It is a further object of the invention to provide novel aromatic polymers based on phenol-aldehyde and phenol-ketone condensates that have such improved properties. It is another object of the invention to provide polymeric products that exhibit low loss of weight on heating at elevated temperatures, and which further exhibit good hydrolytic stability. Another object of the invention is to provide novel processes for making such products. These and other objects of the invention will become apparent from a consideration of the following detailed specification.

In accordance with this invention, there are provided esters of a pentavalent member of the phosphorus family and a phenol-aldehyde or phenol-ketone condensate, characterized in that:

(1) a major proportion of the moiety of the member of the phosphorus family has the formula:

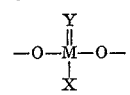

in which the unsatisfied bonds are attached to aryl nuclei of the same phenolic condensate, and in which M is an atom of the phosphorus family, Y is oxygen or sulfur, and X is halogen, hydroxyl, mercapto, hydrocarbyl, hydrocarbyloxy, halogen-substituted hydrocarbyl, halogen-substituted hydrocarbyloxy, or an aryloxy radical of the same phenolic condensate to which M is attached;

(2) at least 60 percent of the phenol-aldehyde or phenol-ketone condensate has o,o'-alkylidene linkages, and (3) the phenolic condensate has an average number of aryl nuclei per molecule in the range of 2.2 to 8.

The preferred range is an average of 2.5 to 5 aryl nuclei per molecule. Members of the phosphorus family of elements, as the expression is employed herein, are the members of Group V of the Periodic Table which have an atomic weight of greater than 30, i.e., phosphorus, arsenic, antimony and bismuth.

In accordance with another aspect of the invention, the foregoing thermoplastic products of the invention can be modified to produce additional thermoplastic products or to produce thermosetting products. Thermoplastic modifications include reaction products with an oxyalkylation agent such as a mono oxirane ring compound, an alkylene halohydrin or an alkylene carbonate. Thermosetting products result from admixture of the thermoplastic products of the invention with such curing agents as hexamethylene-tetramine, or other donors of methylene radicals; or polyepoxides; or polyisocyanates, and the like.

In other aspects of the invention, the foregoing thermoplastic and thermosetting products are utilized to provide shaped articles, such as molded articles, laminates, protective coatings, including drying oil varnishes, abrasive structures, friction elements, and the like.

The phenolic condensates most useful in the practice of the invention are characterized by the following formula:

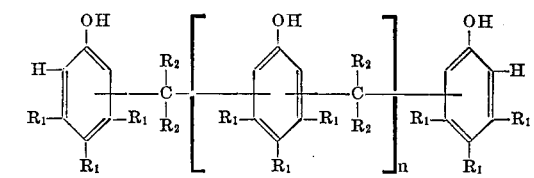

wherein:

$R_1$ is independently selected from the group consisting of hydrogen, fluorine, chlorine, bromine and a hydrocarbon radical;

each of the substituents $R_2$ are independently selected from the group consisting of hydrogen, a hydrocarbon radical, and a halogen-substituted hydrocarbon radical; and $n$ has an average value of about 0.2 to 6, preferably about 0.5 to 3.

Preferably, the phenolic condensates are novolacs, which contain more than one mole of the phenol per mole of the aldehyde or ketone. The condensates have at least 60 percent of o,o′ - alkylidene linkages joining the phenol and aldehyde or ketone residues. Such condensates having a high percentage of o,o′ - alkylidene linkage can be prepared by a process which comprises heating a mixture of a phenol in substantially anhydrous condition with an inorganic alkali catalyst to a temperature of at least 130 degrees centigrade, then introducing the aldehyde or ketone slowly into the preheated mixture, and maintaining the resulting mixture at a temperature of at least 130 degrees centigrade until all the aldehyde or ketone has been introduced. The process can be conducted at atmospheric or at elevated pressure. Suitable catalysts are: the inorganic alkali catalysts such as calcium hydroxide, barium hydroxide, strontium hydroxide, calcium carbonate, barium formate, magnesium hydroxide, zinc oxide, cadmium hydroxide beryllium hydroxide, potassium hydroxide, sodium hydroxide, and the like. Only a small amount of catalyst is generally used, for example, in the range of 0.02 to 5 percent based on the weight of the phenol. It is generally convenient to slurry or dissolve the alkali catalyst in a small amount of water, and to introduce the resulting slurry or solution into the anhydrous phenol, thereafter raising the mixture of catalyst and phenol to the reaction temperature, thereby removing the water added with the alkali. Under the reaction conditions, the water of the condensation reaction continuously evaporates from the reaction mixture and is normally taken off overhead through a distillation zone. The reaction temperature of at least 130 degrees centigrade and up to the boiling point of the phenol is generally maintained until all the aldehyde or ketone has been introduced, and substantially no more water escapes from the mixture at the reaction temperature. Thereafter, the temperature of the mixture can be elevated, if desired, to remove unreacted phenol. An alternative process for producing phenolic condensates having a high percentage of ortho linkage of the phenol and aldehyde or ketone residues involves utilizing a phenol that is substituted in the para-position in a conventional condensation process with an acid catalyst, such as sulfuric acid, hydrochloric acid or oxalic acid. Thereafter, the para-substituent can be removed from the ortho-linked condensate if a curable condensation product is desired. In the condensation processes, the ratio of the aldehyde or ketone to the phenol can be varied to prepare condensates of various molecular weight. Preferably, the ratio is in the range from about 0.5 to 1.0 mole of aldehyde or ketone to one mole of the phenol, preferably from 0.7 to 0.9 mole of aldehyde or ketone per mole of the phenol.

Suitable phenols for use in the preparation of the phenolic condensates having the following formula:

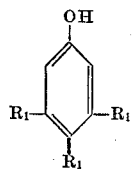

wherein each of the $R_1$ radicals is independently selected from the group consisting of hydrogen, halogen, hydroxyl, hydrocarbyl, hydrocarbyloxy, and hydroxyl-substituted hydrocarbyloxy. The halogen-substituents are preferably chlorine, fluorine, bromine or mixtures thereof. The hydrocarbon radicals can be alkyl and alkenyl groups of 1 to 18 carbon atoms, preferably 1 to 6 carbon atoms; cycloalkyl groups of 5 to 18 carbon atoms, preferably 5 to 8 carbon atoms; and aryl groups of 6 to 18 carbon atoms, preferably 6 to 10 carbon atoms. Aryl is intended to include alkaryl and aralkyl. Suitable phenols are: phenol, cresol, resorcinol, phloroglucinol, 3 - methyl - 5 - ethyl phenol, meta-ethyl phenol, symmetrical xylenol, meta-isopropyl phenol, meta - isooctyl phenol, meta - phenyl phenol, meta - benzyl phenol, meta - cyclohexyl phenol, meta-cetyl phenol, meta-cumyl phenol, meta-methoxy phenol, 3,5 - dimethoxy phenol, resorcinol that is mono-oxyalkylated with an alkylene oxide of 1 to 6 carbon atoms, such as ethylene oxide, propylene oxide, and the like; phloroglucinol that is mono- or di-oxyalkylated with a similar alkylene oxide. The preferred phenols are generally para-unsubstituted as well as ortho-unsubstituted. However, such phenols can be used in admixture with para-substituted phenols such as para - cresol, para - isopropyl phenol, 3,4 - dimethyl phenol, para - chloro phenol, para - fluoro phenol, para - bromo phenol, para - phenyl phenol, para - benzyl phenol, para - cyclohexyl phenol, hydroquinone para - methoxy phenol; hydroquinone that is mono-oxyalkylated with an alkylene oxide such as ethylene oxide or propylene oxide; 3,4 - dichloro phenol, 3,4-dimethoxy phenol, and the like.

The preferred aldehyde for preparing the phenolic condensate is formaldehyde, which can be in aqueous solution or in any of the low polymeric forms of paraformaldehyde. The aldehydes preferably contain 1 to 8 carbon atoms. Other examples include acetaldehyde, propionaldehyde, butyraldehyde, chloroacetaldehyde, 2 - ethyl hexaldehyde, benzaldehyde, furfuraldehyde, ethyl butyraldehyde, pentaerythrose, chloral, and the like. The ketones useful in preparing the phenolic condensates have

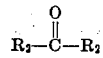

wherein each of the $R_2$ radicals represents an organic radical. The organic radicals are preferably hydrocarbon radicals of 1 to 7 carbon atoms. Examples of suitable ketones include acetone, methyl ethyl ketone, diethyl ketone, methyl benzyl ketone, methyl cyclohexyl ketone, diallyl ketone, as well as mixtures thereof.

The preferred compounds for reaction with the phenolic condensates are those having the following formula:

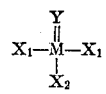

wherein:

M is a member of the phosphorus family (defined for the purpose of describing this invention as a member of Group V of the Periodic Table having an atomic weight of greater than 30, i.e., phosphorus, arsenic, antimony and bismuth);

Y is oxygen or sulfur;

each of the substituents $X_1$ is independently selected from the group consisting of halogen, hydroxyl, mercapto, hydrocarbyloxy, and halogen-substituted hydrocarbyloxy; and $X_2$ is selected from the group consisting of halogen, hydroxyl, mercapto, hydrocarbyl, hydrocarbyloxy, halogen-substituted hydrocarbyl, and halogen-substituted hydrocarbyloxy.

Suitable hydrocarbon radicals include alkyl and alkenyl groups of 1 to 18 carbon atoms, preferably 1 to 6 carbon atoms; cycloalkyl groups of 5 to 18 carbon atoms, preferably 5 to 8 carbon atoms; aryl groups of 6 to 18 carbon atoms preferably 6 to 10 carbon atoms, as well as halogen-substituted species, particularly chlorine and bromine substituted species, and hydroxyl-substituted species of the foregoing hydrocarbon radicals. Illustrative examples of the alkyl substituents are methyl, ethyl, propyl, octyl, dodecyl, stearyl, octadecyl and the like, said alkyl group being a monovalent radical derivable from an aliphatic hydrocarbon by the removal of one hydrogen atom. The halogenated alkyl radicals include chloromethyl, bromoethyl, trifluoromethyl, chlorodecyl, and the like. Illustrative alkenyl substituents include vinyl, allyl, hexenyl, dodecenyl, and the like, said alkenyl group being a radical derivable from an alkene by the removal of one hydrogen atom. Halogen-substituted alkenyl radicals include trichlorovinyl, 2-chloroallyl, 2,3-difluorobutenyl, 2-bromoallyl, and the like. Suitable aryl substituents include phenyl, benzyl, tolyl, phenylethyl, xylyl, naphthyl, hexylphenyl, and the like, said aryl group being a monovalent radical derivable from an aromatic hydrocarbon by the removal of one hydrogen atom. The aryl radicals can be substituted by halogen, such as in p-chlorophenyl, p-bromophenyl, 2,4-dibromophenyl, p-fluorophenyl, and the like. Typical cycloalkyl substituents include cyclohexyl, cyclopentyl, cycloheptyl, cyclooctyl, and the like, said cycloalkyl group being a monovalent radical derivable from an alicyclic hydrocarbon by the removal of one hydrogen atom. Suitable halogen-substituted cycloalkyl radicals include chlorocyclohexyl, bromocyclopentyl, and fluorocyclohexyl, and the like.

The preferred member of the phosphorus family in the preparation of the compositions of the invention is phosphorus. Suitable phosphorus compounds include:

phosphorus oxychloride,
phosphorus oxybromide,
phosphorus thiobromide,
phenylphosphorodichloridate,
phenylphosphorodibromidate,
p-chlorophenylphosphorodichloridate,
benzylphosphorodichloridate,
cyclohexylphosphorodichloridate,
allylphosphorodichloridate,
butylphosphorodichloridate,
octylphosphorodichloridate,
triphenylphosphate,
triphenyl thionophosphate,
diphenylmethyl phosphate,
tributyl phosphate,
tribenzyl phosphate,
phenylphosphonyl dichloride,
phenylphosphonyl dibromide,
p-chlorophenylphosphonyl dichloride,
m-chlorophenylphosphonyl dichloride,
butylphosphonyl dichloride,
benzylphosphonyl dichloride,
cyclohexylphosphonyl dichloride,
dimethyl ethylphosphonate,
dimethyl phenylphosphonate,
bis(chloropropyl)chloropropylphosphonate,
bis(2,3-dibromopropyl)2,3-dibromopropyl phosphonate,
dimethyl methyl thionophosphonate.

Additional phosphorus compounds include methyl phosphonic acid, phenyl phosphonic acid, tolylphosphonic acid, methyl phosphoric acid, phenylphosphoric acid, dimethyl phosphoric acid, diphenyl phosphoric acid, methyl butyl phosphonic acid, diphenyl phosphonic acid, dibutylphosphoric acid, phosphoric acid, and the like.

Illustrative compounds of other members of the phosphorus family include the following compounds: butyldichloroarsine oxide, butyldibromoarsine sulfide, methyldicholoroarsine oxide, phenyldichloroarsine oxide, octylarsonic acid, phenylarsonic acid, butyldichlorostibine sulfide, butyldibromostibine oxide, phenyldichlorostibine oxide, octyldichlorostibine oxide, ethyldichlorostibine oxide, methylstibonic acid, octylstibonic acid, phenylstibonic acid, and the like.

Various reaction conditions can be employed for the reaction of the phenolic condensate and the compounds of the member of the phosphorus family, depending on the characteristics of the starting materials employed and the desired properties of the final products. Generally, the temperature of the reaction is in the range of 100 to 250 degrees centigrade, preferably in the range of 150 to 200 degrees centigrade. Atmospheric pressure is usually employed for the reaction, but superatmospheric pressure or vacuum conditions can be employed, if desired. Reaction time can vary from 0.5 to 15 hours. Various ratios of reactants can be employed, depending on the characteristics of the reactants and desired final products. Generally, up to about 0.5 mole of the compound of the phosphorus family is employed in the reaction mixture per equivalent of phenolic nucleus in the phenolic condensate. The ratio of reactants is preferably within the range of about 0.05 to 0.33 mole of the compound of the phosphorus family per equivalent of phenolic nucleus.

The polymeric esters of the invention generally have up to about 0.5 mole of compound of the phosphorus family incorporated in the composition per equivalent of phenolic nucleus in the phenolic condensate, preferably from about 0.05 to 0.33 mole per equivalent of phenolic nucleus. Generally, a major amount, i.e., at least 50 percent, of the moiety of the member of the phosphorus family has the structure:

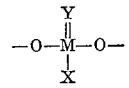

wherein the symbols have the meaning described hereinbefore, and in which the unsatisfied bonds are attached to aryl nuclei of the phenolic condensate. In the compositions of the invention, these unsatisfied bonds are predominantly attached to aryl nuclei of the same molecule of the phenolic condensate. Mixtures of esters are usually obtained.

The polymeric esters of the invention can be modified to produce additionally useful thermoplastic products by reaction of the free phenolic hydroxyl groups with additional reactants. Suitable for this purpose are various oxyalkylation agents such as compounds containing a mono oxirane ring. Monomeric epoxides having 2 to 18 carbon atoms are preferred, of which the alkylene oxides containing 2 to 6 carbon atoms are more preferred. Examples of suitable mono-epoxides are ethylene oxide, propylene oxide, cyclohexene oxide, styrene oxide, allyl glycidyl ether, epichlorohydrin, and the like. Catalysts for the reaction of the oxirane ring compounds with the phenolic hydroxyl groups of the compositions of the invention include the alkali or alkaline earth hydroxides, primary amines, secondary amines, tertiary amines, or basic alkali salts. Typical catalysts include sodium and calcium hydroxides, dimethyl, triethyl, and dimethyl benzyl amines, and salts of strong bases and weak acids such as sodium acetate or benzoate. The hydroxyalkylation reaction can be carried out at 0 to 200 degrees centigrade, preferably at 0 to 100 degrees. Other methods of hydroxyalkylation include reaction of the phenolic hydroxyl groups with alkylene halohydrins, such as ethylene chlorohydrin, propylene bromohydrin or glyceryl chlorohydrin in the presence of an alkali metal hydroxide of the type just described. Still another method of hyrdoxyalkylation includes reaction of the phenolic hydroxyl groups with alkylene carbonates, such as ethylene carbonate and propylene carbonate, using a catalyst such as sodium or potassium carbonate.

The thermoplastic compositions of the invention, including modifications thereof such as described in the preceding paragraph, can be converted to thermosetting compositions by admixture with a curing agent, such as a suitable donor of methylene radicals. Hexamethylene tetramine is preferably employed for this purpose, but formaldehyde and especially the polymeric forms thereof such as paraform and trioxane, can also be employed. Such curing agents can be employed in a proportion in the range of 2 to 20 percent based on the weight of phosphorus ester. The thermosetting compositions can be converted to thermoset or cross-linked products by heating at elevated temperatures, for example, at about 300 to 500 degrees Fahrenheit, for periods of time ranging from a few minutes to one hour or more. Other suitable curing agents include polyepoxides, such as epoxidized soybean oil, epoxidized cotton seed oil, epoxidized castor oil, epoxidized glycerol trioleate, epoxidized glycerol trilinoleate, epoxidized glycerol dioleate, epoxidized methyl linoleate, epoxidized ethyl linoleate, and the like.

The thermoplastic products of the invention, particularly the hydroxyalkylated products, can also be converted to cross-linked products by reaction with an organic polyisocyanate to produce polyurethane products. Suitable polyisocyanates include: 2,4 - tolylene diisocyanate, 2,6 - tolylene diisocyanate, and mixtures thereof, and particularly the crude mixtures thereof that are commercially available. Other typical polyisocyanates include: methylene - bis - (4 - phenyl isocyanate), 1,3-cyclopentylene diisocyanate, 2,4,6 - tolylene triisocyanate, and the like. Polyfunctional isocyanates are provided by the liquid reaction products of (1) diisocyanates and (2) polyols or polyamines and the like. In addition, isothiocyanates and mixtures of isocyanates can be employed. Also contemplated are impure or crude polyisocyanates that are commercially available. Especially preferred are the polyaryl polyisocyanates, particularly polymethylene polyphenylisocyanate.

In preparing such polyurethane compositions, the components are preferably reacted in a ratio sufficient to provide about 85 to 115 percent of isocyanato groups with respect to the total number of hydroxyl groups present in the hydroxyl-containing polymeric material (and foaming agent, if one is provided). The reaction temperature generally ranges from about 20 to about 180 degrees centigrade, although higher and lower temperatures can be employed. Reaction catalysts can be employed, if desired. Suitable catalysts include the tertiary amines, such as triethylamine and tetramethyl butane diamine. Also suitable are the morpholine compounds, such as N-methyl morpholine. When polyurethane forms are desired, foaming agents are incorporated in the reaction mixture. Foaming agents are generally those materials that are capable of liberating gaseous products when heated, or when reacted with an isocyanate. Preferably, foaming is accomplished by introducing a low boiling liquid into the reaction mixture such as fluorochlorocarbon boiling in the range of −30 to 50 degrees centigrade. Typical foaming agents include trichlorofluoromethane, trichlorotrifluoroethane, difluoromonochloroethane, and difluorodichloroethane.

The compositions of the invention can be used in a wide variety of product applications. Thus, the thermoplastic compositions can be used in protective coatings of many varieties, for example, in drying oil varnishes. The thermosetting compositions can be compounded with various fillers, pigments, plasticizers, and other additives and used in the preparation of various molded articles of great utility. The compositions can be utilized with various reinforcing media, such as glass fibers, synthetic polymer fibers, asbestos, carbon fabric, fibrous aluminum oxide, and the like to provide laminated articles. The thermal stability of the compositions is particularly useful in such products as brake linings, clutch facings, grinding wheels, and abrasive paper and cloth. The compositions are also useful in basing cements and as foundry sand binders. The polyurethane compositions can be utilized for the preparation of foamed products, castings, coatings, and the like.

The ester compositions of the invention are useful for the treatment of normally combustible cellulosic materials to render them fire retardant. The cellulosic materials useful in the invention are any of those derived from natural sources such as from wood, cotton and the like; as well as chemically treated varieties such as regenerated cellulose commonly known as rayon. It is generally preferred that the cellulosic material be consolidated in the form of a self-supporting sheet such as paper, or a woven or non-woven fabric. Paper is the preferred cellulosic material of the invention, and all types of paper, made by any of the well-known paper production processes, are contemplated. The ester composition is generally employed in an amount to provide 30 to 100 percent by weight based on the weight of the cellulosic material.

The cellulosic material to be treated is contacted with a solution of the esterification product of the invention in a suitable solvent, such a ketone, such as those described hereinbefore, or a halocarbon, such as carbon tetrachloride, chloroform, methylchloroform, dichloroethylene, trichloroethylene, ethyl dibromide, propylene dibromide, and the like. Generally the solvents have a boiling point of less than 150 degrees centigrade. The contacting step may be carried out in a variety of ways. For example, the cellulosic material can be immersed in a tank containing the solution for a suitable period of time in a batch-wise manner, or can be continuously passed through such a tank by means of rollers which facilitate the passage of a cellulosic sheet such as paper. The composition can also be applied to cellulosic material by spraying, or by passing a sheet of the material through rollers that have been wetted with the solution. The phosphorus composition can be added to the beater in a paper-making process. The temperature of the process can be varied over wide limits, but is preferably at room temperature, or about 30° C. When the cellulosic material has been treated with the solution, the excess solution is drained or squeezed out, and the treated cellulosic material is dried at a temperature up to 150° C. Generally, a suitable curing agent, such as hexamethylene tetramine, is included in the treating solution. Then the dried, treated cellulosic material can be subjected to curing conditions to cure the ester composition by the methods disclosed herein.

In the practice of this invention, mixtures of compounds of a given number of the phosphorus family can be employed in preparing the esterification products of the invention, e.g., a mixture of triphenyl phosphate and trimethyl phosphate. Also mixtures of compounds of the various members of the phosphorus family can be employed, e.g., a mixture of triphenyl phosphate and butyldichlorostibine oxide.

In this specification and claims, the term "alkylidene" is used to express the structural relationship of the substituted methylene residues of the aldehyde or ketone to the phenolic nuclei of the phenolic condensates, and the term is intended to be generic to all such substituted methylene groups defined within the scope of this invention.

The following examples illustrate the various aspects of the invention, but are not intended to limit the invention. Unless specified otherwise, temperatures are given in degrees centigrade and parts are by weight.

EXAMPLE 1

500 parts by weight of anhydrous phenol were heated to 80 degrees centigrade, and mixed with a slurry of 0.9 part of calcium hydroxide in 25 parts of water in a reactor provided with a condenser and in communication with the atmosphere. The mixture was elevated to a temperature of 160 degrees centigrade to remove the added water and provide a substantially anhydrous mixture. While maintaining the temperature at 160 degrees centigrade, 81 parts by weight of a 37 weight percent aqueous solution of formaldehyde was introduced portionwise beneath the surface of the phenol over a period of two hours. During the reaction, distillate was taken overhead from the reaction mixture. The distillate contained chiefly water with a few percent of formaldehyde and phenol. The reaction temperature was maintained at about 160 degrees centigrade until substantially all the water had been removed from the reaction mixture, and thereafter the temperature was elevated to about 200 degrees centigrade to remove unreacted phenol. The product of the process was analyzed and found to contain about 95 percent of material containing o,o'-alkylidene linkage, about 3 percent of material containing o,p'-alkylidene linkage, and about 2 percent of material having p,p'-alkylidene linkage.

EXAMPLE 2

136 parts of high ortho content phenol-formaldehyde novolac (about 95 percent of o,o'-alkylidene linkage) having an average molecular weight of about 550 were heated to 150 degrees centigrade in a stirred reactor. 81 parts of phenylphosphorodichloridate were then added portionwise. The temperature rapidly rose to 170 degrees centigrade and was then maintained at 170 to 180 degrees centigrade throughout the remainder of the reaction. A slow stream of nitrogen was passed through the reactor to facilitate removal of the HCl given off in the reaction. When the HCl evolution stopped, the product was poured into a container and allowed to harden. It was a hard, brittle, non-sticky resin. The product was then pulverized, admixed with about 10 weight percent of hexamethylenetetramine. The mixture readily cured to a hard, infusible resin upon heating to about 160 degrees centigrade. The cured product would not support combustion, but would burn when placed in a direct flame to leave a large firm ash. Chemical analysis of this modified novolac showed that it contained about 6 percent phosphorus. No chlorine was detected. A major proportion of the phosphorus was chemically combined in the product in the form of the cyclic structure wherein two bonds of the phosphorus atom are joined to phenoxy radicals of the same molecule of phenolic condensate.

EXAMPLE 3

A reaction was attempted between phenol-formaldehyde novolac (about 10 percent of o,o'-alkylidene linkage) of average molecular weight 510 and phenylphosphorodichloridate, using the procedure of Example 2. When approximately 7 percent of the phenylphosphorodichloridate had been added, the resin gelled.

EXAMPLE 4

215 parts of the high ortho phenol-formaldehyde novolac (at least 95 percent o,o'-alklidene linkage) of average molecular weight about 550 and 190 parts of triphenyl phosphate were placed in a reactor under a nitrogen atmosphere. After heating to 110 degrees centigrade, one part of sodium was added. After the sodium had dissolved, a vacuum of about 200 mm. of mercury was applied, and the mixture was heated to 180 degrees centigrade, at which point phenol distilled overhead. A total of about 110 parts of phenol was removed overhead, with the reaction mixture reaching a temperature of 220 degrees centigrade. The product was then poured into a container and allowed to harden. The product was physically and chemically similar to that made in Example 2.

EXAMPLE 5

The procedure of Example 4 was repeated using the novolac of Example 3 (average molecular weight 510) in place of the high ortho novolac. Upon removal of a few parts of phenol overhead, the resin in the reactor gelled.

EXAMPLES 6 TO 11

The procedure of Example 2 was repeated with high ortho content phenolic condensates based on other carbonyl compounds and phenols to produce useful products of the invention:

| Example No.: | Carbonyl Compound | Phenol |
| --- | --- | --- |
| 6 | Formaldehyde | Meta-cresol. |
| 7 | do | 3-methyl-5-ethyl phenol. |
| 8 | do | Isopropyl phenol. |
| 9 | Acetaldehyde | Phenol. |
| 10 | Benzaldehyde | Do. |
| 11 | Crotonaldehyde | p-Chlorophenol. |

EXAMPLE 12

A solution of 485 parts by weight of high ortho phenol-formaldehyde novolac (about 95 percent of o,o'-alkylidene linkage) of average molecular weight about 350, 145 parts by weight of triethylamine and 2080 parts by weight of diethyleneglycol dimethylether were placed in a stirred reactor. 207 grams of phenylphosphorodichloridate were then added portionwise. Cooling was provided to maintain the temperature at 25 to 30 degrees centigrade. After the addition was complete, the mixture was heated at 100 degrees centigrade for 1.25 hours. The cooled reaction mixture was poured into water. The resulting sticky solid was dissolved in benzene. The benzene solution was then washed with water until the wash water was free of chloride ion. The solvent was then distilled off and the resulting solid was washed with hot water. The product was a light colored resin that contained 3 percent phosphorus. When mixed with 10 percent hexamethylenetetramine, the product readily cured at about 165 degrees centigrade. The cured resin did not support combustion, but burned, when placed directly in a flame, to leave a large hard ash.

EXAMPLE 13

136 parts of the high ortho novolac used in Example 2, were placed in a reactor under a dry nitrogen atmosphere and heated to 170 degrees centigrade. 100 parts of 2,4-dichlorophenylphosphorodichloridate were then added portionwise, while the temperature was slowly increased to 207 degrees centigrade. After the HCl evolution stopped, the resin was poured into a recepticle and allowed to harden. The product was a hard resin that contained 5.3 percent phosphorus and 12 percent chlorine. When mixed with hexamethylenetetramine, the product readily cured at 165 degrees centigrade.

Paper was impregnated with a mixture of the foregoing resin and hexamethylenetetramine from a chloroform solution. After curing, the resin could not be washed out and the rate of burning of the paper was markedly reduced, as compared to a non-treated sample.

EXAMPLE 14

68 parts of the high ortho novolac used in Example 2 were heated to 180 degrees centigrade, with a slow stream of dry nitrogen passing over it. 52 parts of p-bromophenylphosphorodichloridate were then added portionwise during a three hour period. The temperature was slowly increased to 211 degrees centigrade. The HCl evolved was trapped in a water scrubber, and 98 percent of the theoretical amount was found. The product was a hard, brittle resin which weighed 102 parts. It contained about 5.2 percent phosphorus and 13 percent bromine. When mixed with hexamethylenetetramine, the resin cured to a hard infusible material at about 165 degrees centigrade. The cured resin charred, but would not burn.

The resin was ground up and mixed with 10 percent hexamethylenetetramine. A 25 percent solution of this mixture in chloroform was prepared. Paper was then impregnated with this solution. After drying and curing, the paper burned only with difficulty.

EXAMPLE 15

In the manner of Example 14, 47 parts of the high ortho novolac used in Example 2, were reacted with 40 parts of 2,4-dibromophenylphosphorodichloridate. The product was a clear amber brittle resin that contained about 24 percent bromine and 4.7 percent phosphorous. The cured resin charred when placed in a flame, but did not burst into flame. Paper treated with this resin was self-extinguishing.

EXAMPLE 16

In the manner of Example 14, 100 parts of the same high ortho novolac were reacted with 150 parts of crude pentabromophenylphosphorodichloridate. A viscous product was obtained that gave a hard, brittle, fire resistant resin after cooling.

EXAMPLE 17

To test the thermal stability of the compositions of the invention, samples of carefully desiccated cured resin of 100 to 400 micron size were placed in No. 1 Coors porcelain crucibles and covered with the crucible cover. The crucibles were then placed on a holding tray and baked in an air circulating oven at 400±5 degrees centigrade, for 4 hours. At the end of this time, the crucibles were removed to a desiccator, cooled, re-weighed, and the percent weight loss calculated. Results were as follows.

Type resin: Weight loss, percent
  Novolac used in Example 3 _____ 80–95
  Product of Example 4 _____ 38–40
  Product similar to that of Example 4, but containing 3.6 percent P _____ 41–45
  Product of Example 13 _____ 33–34
  Product of Example 14 _____ 38–41

EXAMPLE 18

Into a stirrer reactor there was placed 500 parts of a high ortho novolac, having about 95 percent of o,o'-alkylidene linkages, 163 parts of trimethylphosphate and 2 parts of sodium. The charge was heated at 180 to 185 degrees centigrade for 23 hours, with provision to remove volatile material as it was formed. In this manner, 78 parts of liquid were removed overhead. The liquid was shown to be methanol by its boiling point and refractive index. The product was then poured into a container and allowed to harden into a brittle solid. The product contained 6 percent P. The product was cured with hexamethylenetetramine to provide a product which was found to have a volatile loss of only 33 percent.

EXAMPLE 19

The procedure of Example 18 was repeated by reacting 1300 parts of a phenol formaldehyde novolac containing about 70 percent o,o'-alkylidene linkages, 652 parts of triphenylphosphate and one part of sodium. Thereafter, 420 parts of phenol were distilled from the reaction mixture that was maintained at 200 to 220 degrees centigrade, under a vacuum of 190 mm. of mercury. There were recovered 1527 parts of product having about 4 weight percent phosphorus. A thermal stability test of the nature employed in Example 17 exhibited only a 36 percent loss of volatiles.

EXAMPLES 20 TO 27

Using the procedure of Example 2, other pentavalent members of the phosphorus family are employed to produce useful, thermally stable products of the invention:

Example No.: Compound of phosphorus family
  20 _____ Phosphorus oxychloride.
  21 _____ Triphenyl thionophosphate.
  22 _____ Methylphosphonyl dibromide.
  23 _____ Bis(chloropropyl) chloropropylphosphonate.
  24 _____ Dibutylphosphoric acid.
  25 _____ Phenylarsonic acid.
  26 _____ Phenyldichloroarsine oxide.
  27 _____ Phenylstibonic acid.

EXAMPLE 28

The thermal stability of the compositions of the invention was determined by Isothermal Gravimetric Analysis using a cured specimen prepared in accordance with Example 2 and containing 6 weight percent phosphorus. A cured specimen of product prepared in accordance with Example 3 was also tested for the purpose of comparison. The latter material was prepared so that it contained the maximum amount of phosphorus that could be incorporated without causing gelation of the material. The phosphorus content of the control was 0.8 percent.

In the test procedure, the samples were ground to 40 to 140 mesh particle size, and exposed to air in an oven. The oven was equipped with a Cahn RG electrobalance and an automatic recorder for continuously recording the weight of the samples. The oven was rapidly heated to 330 degrees centigrade and held at that temperature for 0.5 hour. This initial heating period served to remove volatile material from the samples, and very little weight loss was observed above 250 degrees. Then the oven was rapidly heated to 410 degrees and maintained at that temperature for 40 minutes. The weight loss in this latter heating period was observed and recorded as the weight loss between 250 degrees centigrade and 40 minutes at 410 degrees centigrade. The rate of weight loss at 410 degrees centigrade was determined by measuring the slope of the plot of weight versus time provided by the automatic recorder.

The results of the foregoing test are as follows:

| | Rate of Loss in Weight, percent minute | Weight Loss After 40 minutes at 410° C., less initial loss |
|---|---|---|
| Product from High Ortho Novolac | 0.10 | 3.9 |
| Product from Low Ortho Novolac | 0.26 | 10.7 |

The product of the invention exhibited far greater thermal stability than did the product made with a conventional novolac.

In the foregoing specification, the o,o'-alkylidene content of the phenolic condensates is determined by reacting the phenolic condensate with trimethylchlorosilane to react all the phenolic hydroxyl groups. The resulting composition is fractionated by vapor phase chromatography, and the proportion of the o,o'-isomer is determined.

While this invention has been described with reference to certain specific embodiments, it will be recognized by those skilled in the art that many variations are possible without departing from the spirit and scope of the invention.

We claim:

1. An ester of a pentavalent member of the phosphorus family and a phenolic condensate selected from the group consisting of a phenol-aldehyde condensate and a phenol-ketone condensate, characterized in that:

(1) a major proportion of the moiety of the member of the phosphorus family has the formula:

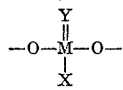

in which the unsatisfied bonds are attached to nuclei of the same molecule of phenolic condensate, and wherein:

M is an atom of the phosphorus family,
  Y is selected from the group consisting of oxygen and sulfur, and
  X is selected from the group consisting of halogen, hydroxyl, mercapto, hydrocarbyl, hydrocarbyloxy, halogen-substituted hydrocarbyl, halogen-substituted hydrocarbyloxy, and an aryloxy radical of the same molecule of phenolic condensate to which M is attached;

(2) at least 60 percent of the phenolic condensate has o,o'-alkylidene linkages; and (3) the phenolic condensate has an average number of aryl nuclei per molecule in the range of 2.2 to 8.

2. An ester of pentavalent phosphorus and a phenol-aldehyde condensate, characterized in that:

(1) a major amount of the phosphorus moiety has the formula:

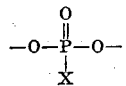

in which the unsatisfied bonds are attached to nuclei of the same molecule of the phenol-aldehyde condensate, and wherein:

X is selected from the group consisting of halogen, hydroxyl, mercapto, hydrocarbyl, hydrocarbyloxy, halogen-substituted hydrocarbyl, halogen-substituted hydrocarbyloxy, and an aryloxy radical of the same molecule of phenol-aldehyde condensate to which the phosphorus atom is attached;

(2) at least 60 percent of the phenol-aldehyde condensate has o,o'-alkylidene linkages; and (3) the phenol-aldehyde condensate has an average number of aryl nuclei per molecule in the range of 2.2 to 8.

3. The ester of claim 2 wherein the phenol-aldehyde condensate is a phenol-formaldehyde condensate which has an average number of phenyl nuclei per molecule in the range of 2.5 to 5.

4. The ester of claim 3 wherein X is hydrocarbyloxy.

5. A cured product of hexamethylene tetramine and an ester of a pentavalent member of the phosphorus family and a phenolic condensate selected from the group consisting of a phenol-aldehyde condensate and a phenol-ketone condensate, characterized in that:

(1) a major proportion of the moiety of the member of the phosphorus family has the formula:

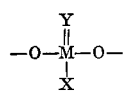

in which the unsatisfied bonds are attached to nuclei of the same molecule of phenolic condensate, and wherein:

M is an atom of the phosphorus family,
Y is selected from the group consisting of oxygen and sulfur, and
X is selected from the group consisting of halogen, hydroxyl, mercapto, hydrocarbyl, hydrocarbyloxy, halogen-substituted hydrocarbyl, halogen-substituted hydrocarbyloxy, and an aryloxy radical of the same molecule of phenolic condensate to which M is attached;

(2) at least 60 percent of the phenolic condensate has o,o'-alkylidene linkages; and
(3) the phenolic condensate has an average number of aryl nuclei per molecule in the range of 2.2 to 8.

6. A fire retardant cellulosic composition comprising a normally combustible cellulosic material and a cured product of hexamethylene tetramine and an ester of a pentavalent member of the phosphorus family and a phenolic condensate selected from the group consisting of a phenol-aldehyde condensate and a phenol-ketone condensate, characterized in that:

(1) a major proportion of the moiety of the member of the phosphorus family has the formula:

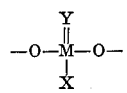

in which the unsatisfied bonds are attached to nuclei of the same molecule of phenolic condensate, and wherein:

M is an atom of the phosphorus family,
Y is selected from the group consisting of oxygen and sulfur, and
X is selected from the group consisting of halogen, hydroxyl, mercapto, hydrocarbyl, hydrocarbyloxy, halogen-substituted hydrocarbyl, halogen-substituted hydrocarbyloxy, and an aryloxy radical of the same molecule of phenolic condensate to which M is attached;

(2) at least 60 percent of the phenolic condensate has o,o'-alkylidene linkages; and
(3) the phenolic condensate has an average number of aryl nuclei per molecule in the range of 2.2 to 8.

7. A process for preparing an ester of a pentavalent member of the phosphorus family and a phenolic condensate, which comprises reacting a phenolic condensate selected from the group consisting of a phenol-aldehyde condensate and a phenol-ketone condensate, wherein at least 60 percent of said condensate has o,o'-alkylidene linkages, and wherein said phenolic condensate has an average number of aryl nuclei per molecule in the range of 2.2 to 8, with a compound of the formula:

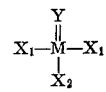

wherein M is a member of the phosphorus family,
Y is selected from the group consisting of oxygen and sulfur,
each of the substituents $X_1$ is independently selected from the group consisting of halogen, hydroxyl, mercapto, hydrocarbyloxy, and halogen-substituted hydrocarbyloxy; and
$X_2$ is selected from the group consisting of halogen, hydroxyl, mercapto, hydrocarbyl, hydrocarbyloxy, halogen-substituted hydrocarbyl, and halogen-substituted hydrocarbyloxy.

8. A mixture comprising hexamethylene tetramine and an ester of a pentavalent member of the phosphorus family and a phenolic condensate selected from the group consisting of a phenol-aldehyde condensate and a phenol-ketone condensate, characterized in that:

(1) a major proportion of the moiety of the member of the phosphorus family has the formula:

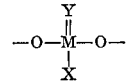

in which the unsatisfied bonds are attached to nuclei of the same molecule of phenolic condensate, and wherein:

M is an atom of the phosphorus family,
Y is selected from the group consisting of oxygen and sulfur, and
X is selected from the group consisting of halogen, hydroxyl, mercapto, hydrocarbyl, hydrocarbyloxy, halogen-substituted hydrocarbyloxy, and an aryloxy radical of the same molecule of phenolic condensate to which M is attached;

(2) at least 60 percent of the phenolic condensate has o,o'-alkylidene linkages; and
(3) the phenolic condensate has an average number of aryl nuclei per molecule in the range of 2.2 to 8.

9. A mixture comprising hexamethylene tetramine, a solvent, and an ester of a pentavalent member of the phosphorus family and a phenolic condensate selected from the group consisting of a phenol-aldehyde condensate and a phenol-ketone condensate, characterized in that:

(1) a major proportion of the moiety of the member of the phosphorus family has the formula:

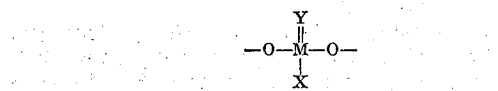

in which the unsatisfied bonds are attached to nuclei of the same molecule of phenolic condensate, and wherein:
 M is an atom of the phosphorus family,
 Y is selected from the group consisting of oxygen and sulfur, and
 X is selected from the group consisting of halogen, hydroxyl mercapto, hydrocarbyl, hydrocarbyloxy, halogen-substituted hydrocarbyl, halogen-substituted hydrocarbyloxy, and an aryloxy radical of the same molecule of phenolic condensate to which M is attached;
(2) at least 60 percent of the phenolic condensate has o,o'-alkylidene linkages; and
(3) the phenolic condensate has an average number of aryl nuclei per molecule in the range of 2.2 to 8.

References Cited

UNITED STATES PATENTS

| | | | |
|---|---|---|---|
| 2,272,668 | 2/1942 | Honel | 260—59 |
| 2,475,587 | 7/1949 | Bender et al. | 260—17.2 |
| 2,549,060 | 4/1951 | Creely. | |
| 2,939,856 | 6/1960 | Steckler et al. | 260—29.3 |
| 3,245,949 | 4/1966 | Murdock | 260—45.95 |
| 3,297,631 | 1/1967 | Bown et al. | 260—45.95 |

OTHER REFERENCES

SPE Transactions, Apr. 4, 1964, pp. 139–43, Kindley et al. "Phosphorus-Containing Phenolic Resins," Copy Sci. Lib., TP 986 AcS2.

WILLIAM H. SHORT, *Primary Examiner.*

E. M. WOODBERRY, *Assistant Examiner.*